Sept. 10, 1935.  F. CAPELLA-DALMAU  2,013,684
MANUFACTURE OF RUBBER TUBES
Filed March 16, 1934
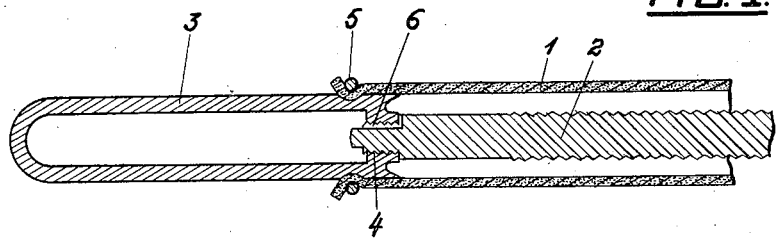
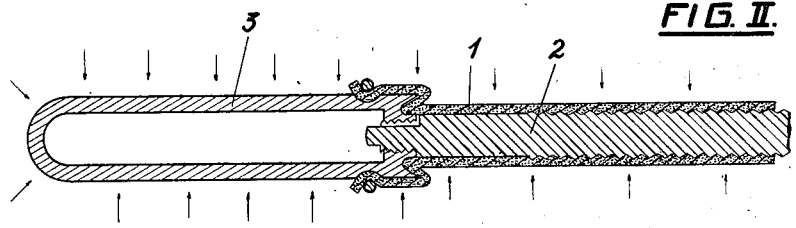
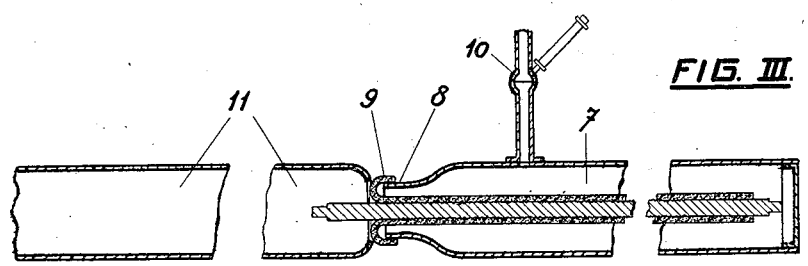
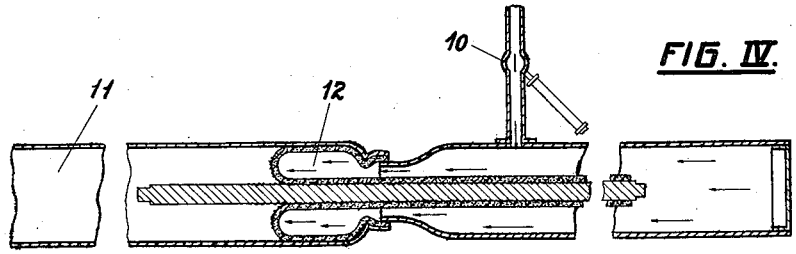
FRANCISCO CAPELLA-DALMAU
INVENTOR
BY Haseltine, Lake & Co.
ATTORNEYS Patented Sept. 10, 1935

2,013,684

UNITED STATES PATENT OFFICE 2,013,684

MANUFACTURE OF RUBBER TUBES

Francisco Capella-Dalmau, Barcelona, Spain

Application March 16, 1934, Serial No. 715,805
In Spain April 28, 1933

3 Claims. (Cl. 18—56)

This invention relates to the manufacture of rubber tubes having designs embossed on or indented in their outer surface. Under the term "rubber tubes" are included all tubes which are made of a mixture which in addition to rubber contains additional substances such as vulcanizing agents, vulcanizing accelerators, agent for protection against perishing, dye stuffs and filling materials.

Various methods of producing such tubes are known. For example, rubber tubes with line reliefs have been extruded from a tube machine and then heated either freely in a steam or air vessel, or after first being drawn on to a mandrel. Thin rubber tubes have also been drawn on to mandrels having projecting embossments and then pressed against the mandrel by external pressure so that the pattern or design on the mandrel was reproduced on the outer surface of the tubes.

Bicycle and motor tyres have also been manufactured by extruding a tube, drawing it on to a smooth mandrel and vulcanizing it under external pressure which is applied either by means of steam or by binding the tube. The vulcanized tubes are then removed from the mandrel by turning them inside out so that the smooth surface comes to the outside.

According to the novel method of manufacturing rubber tubes with designs indented in or embossed upon their outer surfaces, a mandrel bearing the required design is inserted into a tube of soft rubber, and the latter is partially vulcanized on the mandrel by means of a fluid under pressure which presses the tube on to the mandrel and thus causes the design on the mandrel to be reproduced on the inside of the tube whereupon the tube is turned inside out by means of a fluid under pressure into a rigid tube and its vulcanization subsequently completed.

The invention is particularly applicable to the manufacture of tubes having a small diameter and relatively thick walls such as tubes which are used for conveying gas and liquids, for example tubes having an internal diameter of 8 mm. and an external diameter of 12 mm.

A difficulty which may arise in carrying the invention into effect is that the air between the mandrel and the inner surface of the tube may have great difficulty in escaping when the tube is pressed on to the mandrel. If the pressure is first applied midway along the length of the tube and is then extended towards both ends, the air should be driven out but this in practice is not at all easy as the rubber which has not yet been heated will not at this stage conform exactly to the surface of the mandrel. There is also the danger of the steam or other fluid by means of which the pressure is produced entering the space between the tube and the mandrel.

In accordance with a feature of the invention, means are provided for the escape of this air. In the preferred form both ends of the mandrel communicate with rigid walled air containers so that the film of air between the mandrel and the rubber passes under the external pressure into these containers although the fluid causing the pressure cannot pass therein. By using a hot fluid a preliminary vulcanization is obtained and the rubber softens at the start and conforms exactly to the surface of the mandrel.

After this partial vulcanization, the mandrel with the air containers mounted at its ends is removed from the vulcanization vessel, the two air containers are removed and the tube is turned inside out and withdrawn by means of a fluid under pressure in a manner which will be described later in detail. The tube which has been turned inside out is then subjected to unnatural stresses as the inner wall has now become the outer wall and conversely. In the case of a tube of 8 mm. internal diameter, the inner wall which has a circumference of about 25 mm. has to become the outer wall which has a circumference of about 36 mm. and conversely, the outer wall having a circumference of 36 mm. has to become the inner wall. Such a tube has a strong tendency to contract externally and expand internally so that cracks occur which automatically become wider and wider. This is especially the case with thick walled tubes. In accordance with the invention, this difficulty is overcome by only half vulcanizing the tubes in the first place and then after they have been turned inside out, drawing them on to a smooth mandrel and completely vulcanizing them. The internal stresses are thus removed and a cylindrical tube is obtained which has on the outside, a reproduction of the design on the mandrel.

An example of carrying the invention into effect is illustrated in the accompanying drawing in which:—

Figure I is a longitudinal cross section through an end of a mandrel provided with an air container and on to which a rubber tube is to be pressed.

Figure II shows the state of affairs when the rubber tube is pressed on to the mandrel.

Figure III is a diagrammatic view of the apparatus for turning the tube inside out and shows the state of affairs at the initial stage of the turning.

Figure IV is a view corresponding to Figure III showing a further advanced stage of the turning inside out.

The unvulcanized rubber tube 1 surrounds the engraved mandrel 2 to each end of which is fitted an air chamber 3 by means of a screw thread 4. One end of the rubber tube fits over an end of the air chamber and is held thereon by a vulcanized rubber ring 5. The screw thread 4 is provided with air passages 6 so that the air between the mandrel and the rubber tube can escape into the air chamber when the rubber tube is pressed on to the mandrel. The mandrel and its air chambers are placed in a boiler, the steam pressure in which causes the unvulcanized rubber tube to take up the position illustrated in Figure II. The tube softens during the first phase of the heating and thus adapts itself exactly to the mandrel. It then gradually assumes the elastic structure of vulcanized rubber and the pattern on the mandrel is reproduced on the inside of the tube. However, the vulcanization is interrupted before it is completely effected and the tube is removed from the mandrel by turning it inside out. This is effected in the following manner:—

The two air chambers are removed from the mandrel and the latter is placed in a long container 7. One end 9 of the rubber tube is turned back about the edge of the open side 8 of this container. Compressed air is then allowed to enter through the valve 10 in the direction of the arrows in Figure IV and turns the entire tube inside out and drives the mandrel out. When the tubes have patterns indented in or embossed upon their inner surface, a greater pressure is required to turn them inside out owing to the greater adherence of the rubber to the mandrel than with the smooth tubes. This pressure is great enough to cause the tube coming out of the container 7 to expand like an elongated balloon.

In order to prevent this ballooning, a rigid walled pipe 11 is held in front of the mouth of the container 7 so that the tube can be turned inside out into it. This operation will be clear from Figure IV and it will be appreciated that the size of the tube 11 and the size of its opening are proportioned in accordance with the thickness of the walls of the tube so that the tube is not injured either by excessive expansion or by bending. A uniform layer 12 of air is maintained between the two surfaces of the tube which are being displaced relatively to each other which entirely prevents friction between surfaces. In this way the process of turning the tube inside out takes only a matter of seconds. In the case of long tubes, having a length for example of more than 30 feet and particularly when the tubes are also of large diameter so that heavy mandrels are required, the driving force of the air can be assisted by pulling on the front end of the mandrel. The end of the mandrel can be suitably guided so that it is not scratched on the inside of the tube 11.

Obviously, instead of compressed air another gas or liquid can be employed as a pressure medium, if special circumstances appear to make this advisable as the three factors which play a part in the turning of the tube inside out are the pressure of the pressure medium, the ratio of the diameter of the rubber tube to the tube 11 and the equality of the rubber which, of course, is temporarily subjected to very high stress.

After this, the vulcanization of the tube as previously mentioned, is finished on a smooth mandrel in order to give it an equalized internal tension.

The clearance between the mandrel 2 and the tube 1 has been somewhat exaggerated in Figure I. The size of the air chamber 3 must of course be such that the air between the tube and the mandrel can be forced into it without the use of an unduly large steam pressure on the outside of the tube.

Having now particularly described and ascertained the nature of my said invention and in what manner the same is to be performed, I declare that what I claim is:—

1. A method of manufacturing rubber tubes having a small diameter and relatively thick walls with designs indented in or embossed on their outer surfaces, which, in combination, comprises partially vulcanizing the rubber tube in open steam on a mandrel bearing the required design, subsequently turning the rubber tube inside out, and completing the vulcanization of the tube in open steam on another mandrel having a smooth surface.

2. A method of manufacturing rubber tubes having a small diameter and relatively thick walls with designs indented in or embossed on their outer surface, which, in combination, comprises partially vulcanizing the rubber tube in open steam on a mandrel bearing the required design, subsequently extruding the mandrel by means of the pressure of a fluid and simultaneously turning the rubber tube inside out, and completing the vulcanization of the tube in open steam on a mandrel having a smooth surface.

3. The method of manufacturing rubber tubes having a small diameter and relatively thick walls with a finished exterior, which, in combination, comprises first partially vulcanizing the rubber tube while inside out in open steam with the normal exterior of the tube supported upon a mandrel and the normal interior exteriorly exposed to the action of the steam, subsequently extruding the mandrel by applying the pressure of a fluid thereto, and simultaneously turning the previously exposed side of the tube inward, and completing the vulcanization of the tube in open steam while supporting the interior upon a smooth mandrel and exposing the exterior directly to the action of the steam.

FRANCISCO CAPELLA-DALMAU.